United States Patent
Lina (10) Patent No.: US 12,322,128 B2
(45) Date of Patent: Jun. 3, 2025

(54) METHOD, SYSTEM AND APPARATUS FOR PHOTOMETRIC STEREO RECONSTRUCTION OF A SURFACE

(71) Applicant: Matrox Electronics Systems, Ltd., Lincolnshire, IL (US)

(72) Inventor: Arnaud Lina, Montreal (CA)

(73) Assignee: Matrox Electronics Systems, Ltd., Quebec (CA)

( * ) Notice: Subject to any disclaimer, the term of this patent is extended or adjusted under 35 U.S.C. 154(b) by 202 days.

(21) Appl. No.: 18/202,232

(22) Filed: May 25, 2023

(65) Prior Publication Data

US 2023/0419523 A1 Dec. 28, 2023

Related U.S. Application Data

(60) Provisional application No. 63/356,478, filed on Jun. 28, 2022.

(51) Int. Cl.
| | |
|---|---|
| *G06T 7/586* | (2017.01) |
| *H04N 13/106* | (2018.01) |
| *H04N 13/207* | (2018.01) |
| *H04N 13/254* | (2018.01) |

(52) U.S. Cl.
CPC ........... *G06T 7/586* (2017.01); *H04N 13/106* (2018.05); *H04N 13/207* (2018.05); *H04N 13/254* (2018.05); *G06T 2207/10152* (2013.01); *G06T 2207/30168* (2013.01)

(58) Field of Classification Search
CPC ........... G06T 7/586; G06T 2207/10152; G06T 2207/30168; H04N 13/106; H04N 13/207; H04N 13/254
See application file for complete search history.

(56) References Cited

U.S. PATENT DOCUMENTS 7,315,379 B2    1/2008  Jinno
9,883,167 B2 *  1/2018  Matthews ............... G06T 7/586
(Continued)

FOREIGN PATENT DOCUMENTS

WO    2021/177163 A1    9/2021

OTHER PUBLICATIONS

International Search Report and Written Opinion for International Application No. PCT/IB2023/056643 mailed on Sep. 27, 2023.

*Primary Examiner* — James T Boylan (57) ABSTRACT

A method includes capturing a first image of a surface illuminated from a first direction along an axis by a first light at a first elevation angle with other lights of the illumination system off, and capturing a second image of the surface illuminated from a second direction along the axis by a second light at a second elevation angle with the other lights off, the second direction being opposite the first direction, the second elevation angle being substantially identical to the first elevation angle. The images are processed by taking a derivative of a reflected light intensity at each of a plurality of pixel locations in the images, respectively. The respective derivatives are employed to identify a set of invalid pixels where a photometric stereo condition is not satisfied. A photometric stereo reconstruction is generated based on a set of images and the identified set of invalid pixels.

22 Claims, 6 Drawing Sheets

(56) References Cited

U.S. PATENT DOCUMENTS

| | | | |
|---|---|---|---|
| 2005/0254378 A1* | 11/2005 | Wagner | G01B 11/24 |
| | | | 369/47.1 |
| 2010/0039427 A1* | 2/2010 | Yun | G06T 15/02 |
| | | | 345/419 |
| 2011/0304705 A1 | 12/2011 | Kantor et al. | |
| 2012/0062719 A1* | 3/2012 | Debevec | H04N 23/56 |
| | | | 348/E5.024 |
| 2016/0284094 A1* | 9/2016 | Wetzler | G06T 7/586 |
| 2024/0044785 A1* | 2/2024 | Rothwell | G01N 21/3563 |

\* cited by examiner

METHOD, SYSTEM AND APPARATUS FOR PHOTOMETRIC STEREO RECONSTRUCTION OF A SURFACE

CROSS REFERENCE TO RELATED APPLICATIONS

The current application is a non-provisional of and claims the benefit of U.S. Provisional Application No. 63/356,478, filed on Jun. 28, 2022, which is hereby incorporated by reference in its entirety.

BACKGROUND OF INVENTION

1. Field of Invention

Embodiments of the invention relate to the field of image processing, and more specifically, to photometric stereo reconstruction of the surface of an object.

2. Discussion of Related Art

Photometric stereo techniques combine the information from multiple images of an object illuminated successively from different directions to "reconstruct" information on the shape of the object such as local changes in curvature, height or depth, or properties of the object's surface (e.g., reflectivity). Photometric stereo systems are used in a variety of applications such as the three-dimensional (3-D) reconstruction of objects, the detection of defects on surfaces (e.g., scratches), and the recognition of characters that are embossed or etched on a surface.

Photometric stereo techniques rely on a theoretical model relating an intensity of light reflected from a surface with the direction of incoming light from a light source, the direction of the surface normal, and the reflectivity of the surface.

In practice, noise from various sources (such as imprecision in the direction of incoming light, noise introduced by the camera such as lens distortion, non-uniform reflectivity of the surface, etc.) can cause the photometric stereo system to behave differently from the theoretical model causing artifacts in the photometric stereo results. For example, in a photometric stereo system employed to measure changes in local curvature (for example, to read embossed characters or detect scratches), a change in reflectivity of the surface (e.g., due to text printed on the surface) can appear as a change in local curvature in the photometric stereo results. As a result, the photometric stereo system incorrectly detects a change in curvature in the object where the curvature does not exist.

SUMMARY OF INVENTION

Therefore, there is a need for methods, systems and apparatus that minimize artifacts in photometric stereo results. These approaches provide methods, apparatus and systems that employ pairs of light sources to illuminate an object, capture a corresponding image for each of the respective light sources, and process the images for an enhanced view of variations in the surface of the object. For example, these approaches can be used to improve the quality of non-calibrated photometric stereo reconstruction by identifying pixels in the image that are invalid. According to various embodiments, multiple images of an object are processed to determine whether a mathematical condition exists where a presence of a selected mathematical result is indicative of a pixel or pixels that are not valid. In one embodiment, an output of the process includes a photometric stereo reconstruction without any attenuation along with an identification of a set of invalid pixels. According to another embodiment, the output of the process includes a photometric stereo reconstruction with attenuation to reduce or eliminate the effect of invalid pixels on the reconstruction. According to this embodiment, an application receives the attenuated photometric stereo reconstruction and can employ it directly, that is, without a need for further correction to address errors that originate with the invalid pixels.

According to some embodiments, a photometric stereo system is provided for reconstruction of the surface of an object. According to one embodiment, the system includes a set of light sources, a camera and a processor. The light sources direct light in different directions onto the surface. The set of light sources includes a pair of light sources, including a first light source and a second light source, that direct light in opposite directions onto the surface. The camera acquires an image of the surface illuminated by each of the light sources, respectively, providing a set of images. The set of images includes a first image of the surface illuminated by the first light source and a second image of the surface illuminated by the second light source. The processor identifies, based on the first image and the second image, a set of pixels where a condition of photometric stereo is not respected. The processor then provides, based on the set of images and the identified set of pixels, a photometric stereo reconstruction of the surface. In a further embodiment, the system includes two pairs of light sources. In still other embodiments, the system includes three or more pairs of light sources.

According to various embodiments, a method includes detecting a set of pixels where a photometric stereo condition is not respected (resulting in an uncertain photometric stereo reconstruction with possible artifacts) and returning a photometric stereo reconstruction result that takes into account this set of pixels somehow. According to one embodiment, the condition of this set of pixels is addressed by correcting the values of these pixels in a previously-calculated photometric stereo result (e.g., obtained using known equations) to return a corrected photometric stereo reconstruction. According to an alternate embodiment, the condition of this set of pixels is addressed by considering the set of pixels directly in the calculation of the photometric stereo reconstruction result (e.g., for example, by modifying the known equations for these pixels using different weighting factors). In this embodiment, artifacts are attenuated in the photometric stereo reconstruction result.

Two light sources are located opposite one another and form a "pair of light sources" when they are spaced 180 degrees apart from one another around an axis normal to a plane in which the surface is located where each of the two light sources is directed toward the surface. As used herein, the term "opposite" as used to describe the direction of two sources of illumination refers to illumination directed from a first source of illumination that can be at any elevation angle from 0-180 degrees relative to the plane in which the surface is located and illumination directed from a second source of illumination that can be at any elevation angle from 0-180 degrees relative to the plane in which the surface is located where the two sources of illumination are located 180 degrees from one another around the normal-axis. One of ordinary skill in the art will understand based on the disclosure provided herein that two sources of illumination can be opposite one another if they are oriented as described in the preceding sentence even where their elevation angles differ from one another.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figures 1A, 1C:
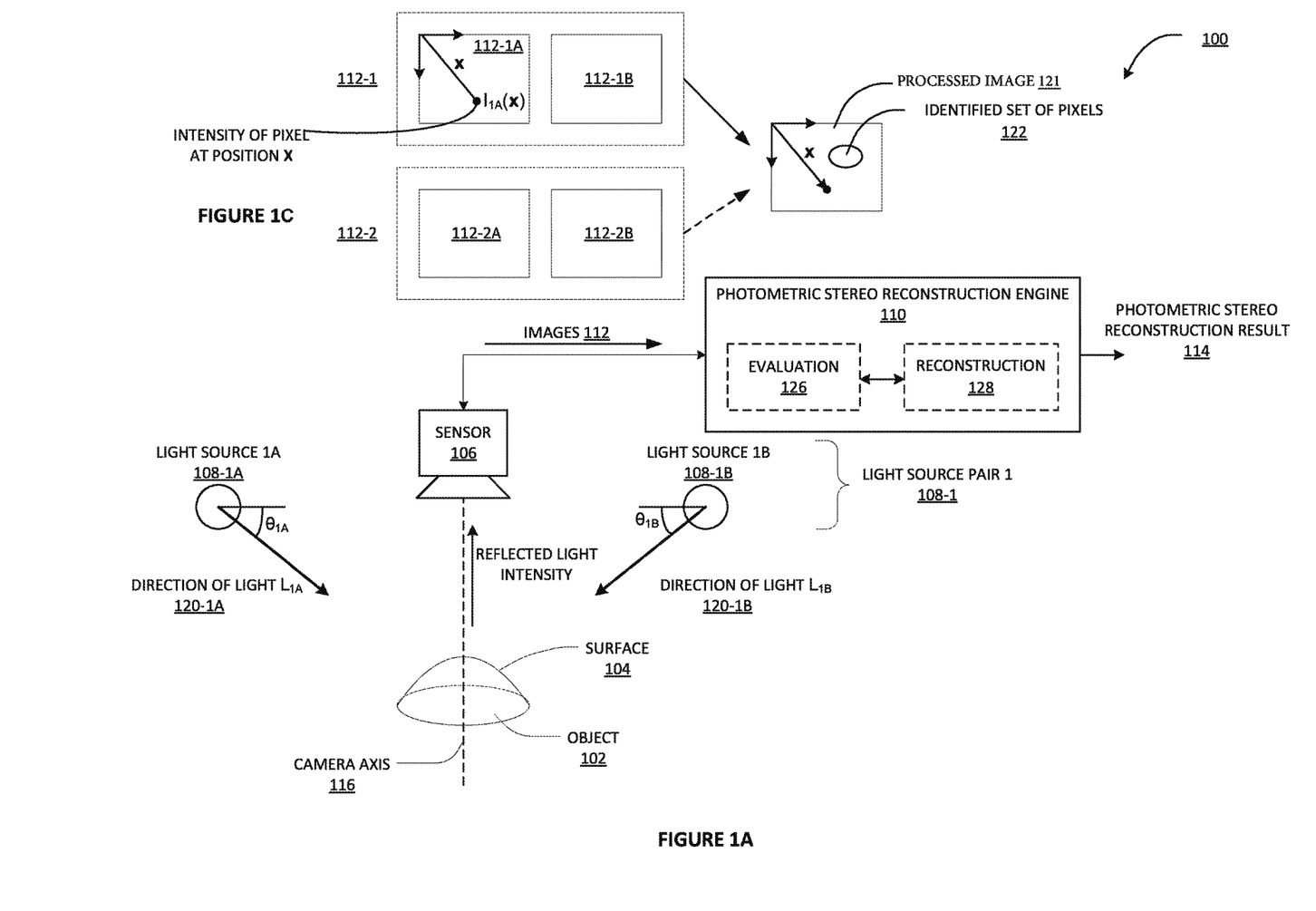
FIG. 1A illustrates a block diagram of a side view of a photometric stereo system in accordance with one embodiment.
FIG. 1C illustrates images captured with the photometric stereo system of FIGS. 1A and 1B.
Figure 1B:
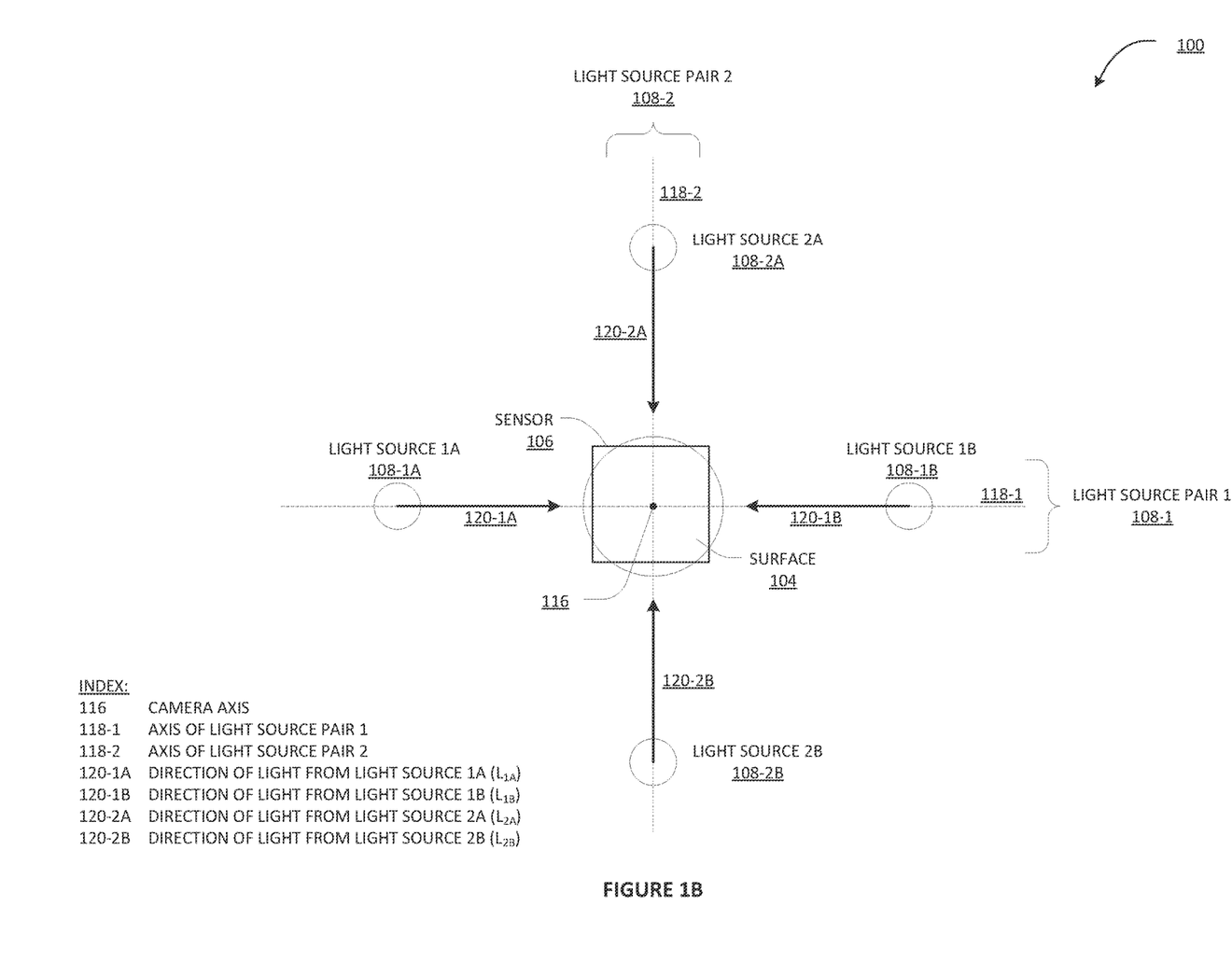
FIG. 1B illustrates a block diagram of a top view of the photometric stereo system of FIG. 1A.

Referring to FIGS. 1A and 1B, a photometric stereo system 100 is illustrated in accordance with various embodiments. According to the illustrated embodiment, the system 100 includes a sensor 106, a plurality of light sources 108, and a photometric stereo reconstruction engine 110. In general, the system 100 operates to illuminate the surface 104 of an object 102 from different directions using the plurality of light sources 108 and to produce images 112 of the surface 104 using the sensor 106. The images 112 are processed by the engine 110 to produce a photometric stereo reconstruction result 114 of the surface 104. The sensor 106 can include a camera, for example, a digital camera, or other image acquisition device. According to various embodiments, the plurality of light sources 108 includes one or more pairs of light sources.

According to the illustrated embodiment, the plurality of light sources 108 includes a first pair of light sources 108-1 including a first light source 108-1A and a second light source 108-1B. The first light source 108-1A is arranged to illuminate the surface 104 along a first axis 118-1 (illustrated in FIG. 1B) in a first direction 120-1A. The second light source 108-1B is arranged to illuminate the surface 104 along the first axis 118-1 in a second direction 120-1B that is opposite the first direction 120-1A. According to the illustrated embodiment, the first light source 108-1A is arranged to illuminate the surface 104 from above at a first elevation angle $\theta_{1A}$. The second light source 108-1B is arranged to illuminate the surface 104 from above at a second elevation angle $\theta_{1B}$. According to one embodiment, the first elevation angle $\theta_{1A}$ and the second elevation angle $\theta_{1B}$ are both set substantially at the same elevation angle $\theta_1$.

Referring now to FIG. 1B, a second pair of light sources 108-2 included in the system 100 is illustrated in accordance with one embodiment. FIG. 1B illustrates both the first axis 118-1 referred to above and a second axis 118-2. As illustrated, the first axis 118-1 and the second axis 118-2 are orthogonal to one another and intersect at the camera axis 116 of sensor 106. The second pair of light sources 108-2 includes a third light source 108-2A and a fourth light source 108-2B. The third light source 108-2A is arranged to illuminate the surface 104 along the second axis 118-2 in a third direction 120-2A. The fourth light source 108-2B is arranged to illuminate the surface 104 along the second axis 118-2 in a second direction 120-2B that is opposite the first direction 120-2A. According to one embodiment, the third light source 108-2A is arranged to illuminate the surface 104 from above at a third elevation angle $\theta_{2A}$ (not shown). The fourth light source 108-2B is arranged to illuminate the surface 104 from above at a fourth elevation angle $\theta_{2B}$ (not shown). According to one embodiment, the first elevation angle $\theta_{2A}$ and the second elevation angle $\theta_{2B}$ are both set substantially at the same elevation angle $\theta_2$.

According to the embodiment illustrated in FIGS. 1A and 1B, the system 100 includes four light sources (two pairs) equally spaced at 90 degrees apart around the object 102. According to other embodiments, the system 100 may include a larger number of light sources, such as eight light sources (four pairs) equally spaced at 45 degrees apart around the object 102 or twelve light sources (6 pairs) equally spaced at 30 degrees apart around the object 102. According to other embodiments, the system 100 includes three or more light sources including at least one pair of light sources arranged as described above.

Referring to FIG. 1C, two pairs of images of the surface 104 captured with the sensor 106 of the system 100 of FIGS. 1A and 1B are illustrated. These include a first pair of images 112-1 captured using for illumination the first pair of light sources 108-1 and a second pair of images 112-2 captured using for illumination the second pair of light sources 108-2. The first pair of images 112-1 includes a first image 112-1A of the surface 104 as illuminated by the first light source 108-1A and a second image 112-1B of the surface 104 as illuminated by the second light source 108-1B. The second pair of images 112-2 includes a third image 112-2A of the surface 104 as illuminated by the third light source 108-2A and a fourth image 112-2B of the surface 104 as illuminated by the fourth light source 108-2B. Generally, an image of the surface 104 illuminated by one of the light sources 108 is captured with all the other light sources 108 turned off. According to embodiments where there are additional pairs of light sources, the system 100 operates to capture, with the sensor 106, a pair of images for each pair of light sources. According to these embodiments, the system 100 includes pairs of light sources where the light sources within a pair illuminate the surface 104 from opposite directions along a common axis. This allows symmetry properties relating to a particular photometric stereo configuration to be exploited to identify pixels that are invalid (that is, pixels where a photometric stereo condition is not satisfied and, therefore, a resulting photometric stereo reconstruction may not accurately represent the surface). In particular, a consideration of the symmetry properties simplifies the photometric stereo equations providing a test to directly detect uncertain pixels.

According to the illustrated embodiment, each of the images 112 includes a plurality of pixels where each pixel is associated with a position and an intensity, where the intensity of each pixel corresponds to an intensity of the light reflected from the surface 104 at the pixel location. According to the embodiment illustrated in FIG. 1C, a coordinate system (shown in the top left corner of the image 112-1A) is employed to allow an identification of pixel locations throughout each image. In FIG. 1C, each pixel location identified using the coordinate system is represented as x and the intensity of the pixel (reflected light intensity) at any pixel location x is represented as I(x), for example, $I_{1A}(x)$ in the case of image 112-1A. In the examples and description provided herein, for clarity, the axes of the coordinate system correspond to the axes of the pairs of light sources (e.g., the 'x' axis corresponds to the first axis 118-1 and the 'y' axis corresponds to the second axis 118-2).

In operation, the photometric stereo reconstruction engine 110 provides a photometric stereo reconstruction result 114 for the surface 104 based on the images 112. According to the illustrated embodiment, the photometric stereo reconstruction engine 110 includes an evaluation module 126 and a reconstruction module 128. According to these embodiments, the evaluation module 126 operates to identify any invalid pixels in the images 112. The reconstruction module 128 employs the information concerning any invalid pixels to generate the photometric stereo reconstruction result 114.

Referring again to FIG. 1C, the processing of the images 112 by the photometric stereo reconstruction engine 110 provides a processed set of pixels (e.g. included in a processed image) 121 that includes an identified set of pixels 122. The identified set of pixels 122 is a set of invalid pixels, that is, a set of pixels where a photometric stereo condition is not respected. According to various embodiments, the photometric stereo reconstruction engine 110 identifies, based on at least one pair of images included in the set of images 112, a set of pixels 122 where a photometric stereo condition is not satisfied and, therefore, a photometric stereo reconstruction result is uncertain (i.e., may be incorrect). The photometric stereo reconstruction engine 110 then provides, based on the set of images 112 and the identified set of pixels 122, a photometric stereo reconstruction result 114 for the surface 104.

According to some embodiments, the engine 110 operates to correct the value of the identified set of pixels 122 in a previously calculated photometric stereo reconstruction result (not shown) to obtain the photometric stereo reconstruction result 114. In other embodiments, the engine 110 processes the identified set of pixels 122 differently from the remaining pixels included in the processed set of pixels 121 to calculate the photometric stereo reconstruction result 114. In yet other embodiments, the engine 110 does not use the identified set of pixels 122 for correction or reconstruction, but returns the identified set of pixels 122 included with the photometric stereo reconstruction result 114 such that a receiving application or module (not shown) can use this information.

Figure 2:
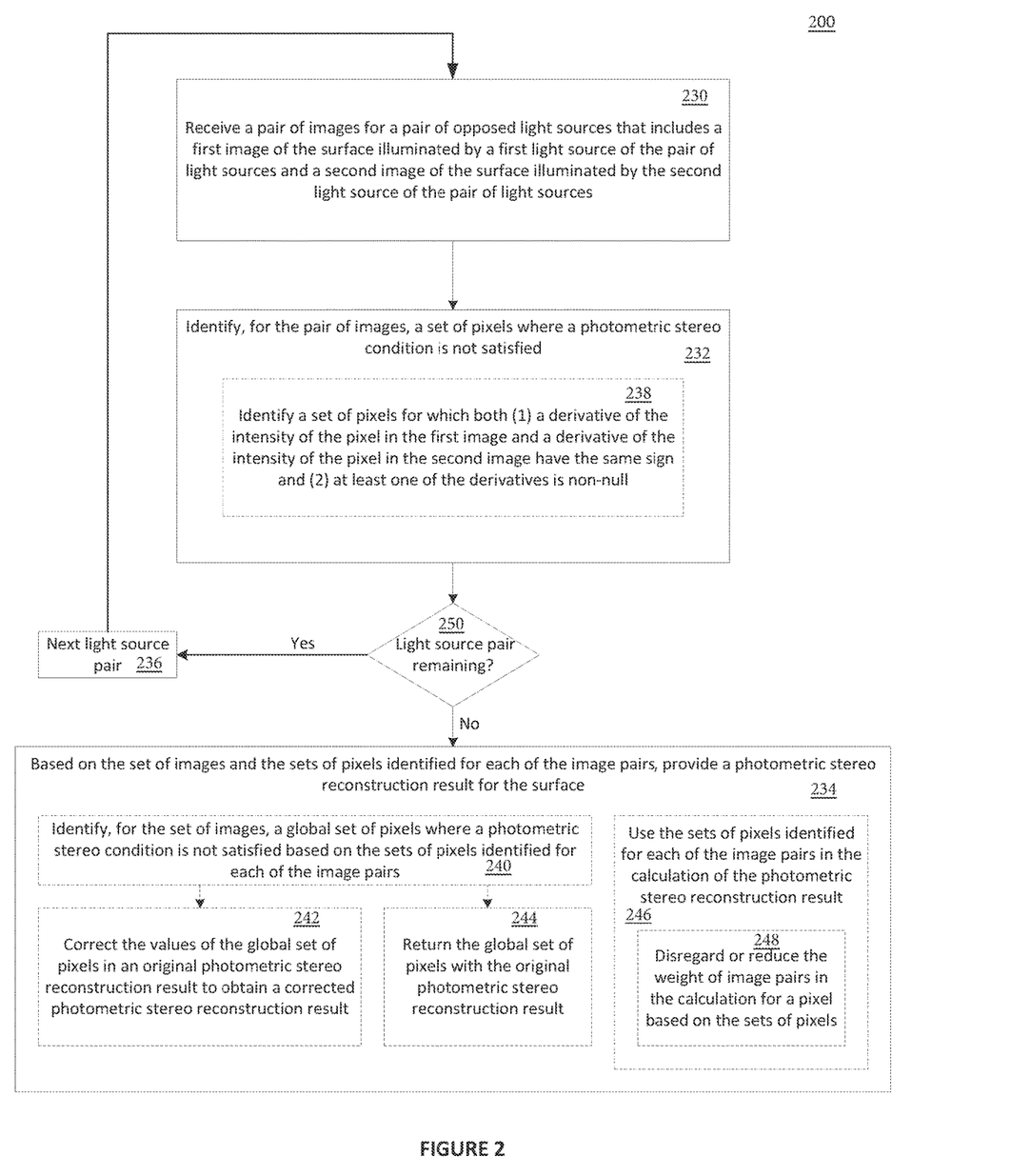
FIG. 2 illustrates a process flow diagram for processing images to produce a photometric stereo reconstruction in accordance with one embodiment.

Referring now to FIG. 2, a flow diagram illustrating a process 200 for processing images to produce a photometric stereo reconstruction is illustrated in accordance with various embodiments. The process 200 includes a set of acts and decision points. The acts include an act of receiving a pair of images for a pair of light sources 230, an act of identifying a set of pixels for the pair of images 232, an act of selecting another pair of light sources 236, and an act of providing a photometric stereo reconstruction result 234. The process 200 includes as a decision point an act of determining whether any light source pairs remain 250.

According to the illustrated embodiment, the act of receiving a pair of images for a pair of light sources 230 includes receiving a first image of the surface illuminated by a first light source and a second image of the surface illuminated by a second light source. According to the illustrated embodiment, the act of identifying a set of pixels for the pair of images 232 includes an act of identifying a set of pixels based on a derivative of the intensity of the pixel in the first image and a derivative of the intensity of the pixel in the second image 238. The act of providing a photometric stereo reconstruction result 234 includes, according to a first approach, an act of identifying a global set of pixels 240 followed by an act of correcting values of the global set of pixels 242 or an act of returning the global set of pixels 244. The act of providing a photometric stereo reconstruction result 234 includes, according to a second approach, an act of using the sets of pixels identified for each image pair 246 including an act of disregarding or reducing the weight of image pairs 248.

In general, the process 200 operates to generate a photometric stereo reconstruction from one or more pairs of images of a surface of an object, for example, images captured by the system 100 of FIGS. 1A and 1B. According to the illustrated embodiment, the process 200 begins at the act of receiving a pair of images for a pair of light sources 230. Here, a first image of the surface taken when the surface is illuminated by a first light source of the light source pair is received along with a second image of the surface taken when the surface is illuminated by a second light source of the light source pair. According to these embodiments, the first light source and the second light source are opposing light sources that illuminate the surface from opposite directions. When the images are received, the process 200 moves to the act of identifying a set of pixels for the pair of images 232. In particular, the act 232 identifies a set of pixels where a photometric stereo condition is not satisfied. In the illustrated embodiment, the act 232 includes an act of identifying a set of pixels where, firstly, the same sign exists for values of a derivative of the intensity of the pixel in the first image and a derivative of the intensity of the pixel in the second image and, secondly, at least one of the derivatives is non-null 238. In the illustrated embodiment, the act 238 only identifies those pixels where the respective derivative values have the same sign where at least one of the derivatives is also not a null value.

According to this embodiment, the act 238 exploits symmetry properties relating to a particular photometric stereo configuration to identify pixels that are invalid (that is, pixels where a photometric stereo condition is not satisfied and, therefore, a resulting photometric stereo reconstruction may not accurately represent the surface). For example, a known mathematical relationship exists between the derivative of the reflected light intensity at a given pixel when the surface is illuminated from a first direction and the derivative of the reflected light intensity at the pixel when the surface is illuminated from a second direction where the light sources are opposing one another and are oriented at the same elevation angle. This relationship provides that a proper photometric stereo condition exists where, with neither derivative having a null value, the derivatives do not have the same sign. At the act 238, the process includes mathematical operations, for example, including a multiplication of the two derivatives, to evaluate this condition. Where a proper photometric stereo condition exists, the result of the multiplication is a negative value. However, if both derivatives are negative or both derivatives are positive, the result of the multiplication is a positive value. At act 238, the pixels where the preceding result is found are identified and included in a set of pixels that are not valid.

In greater detail, photometric stereo techniques rely on a theoretical model relating an intensity of light reflected from a surface (I) with the direction of incoming light from a light source (L), the direction of the surface normal (n), and the reflectivity of the surface (k):

$$I = k(x) . \vec{L} . \vec{n} \quad \text{(equation 1)}$$

For a light source of a light source pair: After decomposing in the x and z directions, where x is the axis of the light source pair (e.g., 118-1) and z is the camera axis (e.g., 116), equation 1 can be rewritten as $$I = k(x)[\cos\theta - \sin\theta]\begin{bmatrix} n_x \\ n_z \end{bmatrix} \quad \text{(equation 2)}$$

After deriving equation 2 in the direction x (assuming k(x) is constant in a neighborhood of x), the following equation is obtained:

$$\frac{dI}{dx} = k\left(\cos(\theta)\frac{\partial n_x}{\partial x} - \sin(\theta)\frac{\partial n_z}{\partial x}\right) \quad \text{(equation 2)}$$

Since n is a normal vector, $$n_x^2 + n_z^2 = 1 \quad \text{(equation 3)}$$

$$\frac{\partial}{\partial x}(n_x^2 + n_z^2) = 0 \quad \text{(equation 4)}$$

By decomposing, the following equations are obtained:

$$2n_x\frac{\partial n_x}{\partial x} + 2n_z\frac{\partial n_z}{\partial x} = 0 \quad \text{(equation 5)}$$

$$\frac{\partial n_z}{\partial x} = -\frac{n_x}{n_z} * \frac{\partial n_x}{\partial x} \quad \text{(equation 6)}$$

By combining equations 2 and 6, the following equations are obtained:

$$\frac{dI}{dx} = k\frac{\partial n_z}{\partial x}\left(\cos(\theta) + \sin(\theta)\frac{n_x}{n_z}\right) \quad \text{(equation 7)}$$

$$I' = kn'(\cos(\theta) + \sin(\theta) \cdot CoT_{\vec{n}}) \quad \text{(equation 8)}$$

The equations for the pair of light sources, a first light source A and second light source B, are provided by:

$$|\theta_A| = |\theta_B| \quad \text{(equation 9)}$$

$$\begin{cases} I'_A = kn'(\cos(\theta) + \sin(\theta) \cdot CoT_{\vec{n}}) & \text{(equation 10)} \\ I'_B = kn'(-\cos(\theta) + \sin(\theta) \cdot CoT_{\vec{n}}) & \text{(equation 11)} \end{cases}$$

The equation for the second light source is the same except for the different sign of the cosine element given the light from the second light source is in the opposite direction. By multiplying equations 10 and 11, the following equation is obtained:

$$I_A'*I_B' = k^2*n'^2(\sin(\theta)^2 CoT_{\vec{n}}^2 - \cos(\theta)^2) \quad \text{(equation 12)}$$

It follows that:

$$\text{Sign}(I_A'*I_B') = \text{Sign}(\sin(\theta)^2 CoT_{\vec{n}}^2 - \cos(\theta)^2) \quad \text{(equation 13)}$$

In the following case:

$$\sin(\theta)^2 CoT_{\vec{n}}^2 - \cos(\theta)^2 < 0 \quad \text{(equation 14)}$$

Or equivalently:

$$CoT_{\vec{n}}^2 < CoT_\theta^2 \quad \text{(equation 15)}$$

For this equation to be true, the angle of $\vec{n}$ must be within the range [θ, 180°−θ]. However, for the photometric stereo principle to work, the angle of the surface normal must be comprised between [θ, 180°−θ] otherwise no light hits the surface (light occlusion).

Therefore, for a valid reconstruction, $\text{Sign}(I_A'*I_B')$ should be negative or equivalently $I_A'$ and $I_B'$ should be of opposite signs, except if either is null.

If $I_A'$ and $I_B'$ are of the same sign, then the reconstruction is likely invalid.

The process 200 moves from the act 238 to the act of determining whether any light source pairs remain 250. Here, a determination is made whether the process 200 has already processed pairs of images from each pair of light sources employed to illuminate the surface of the object. For example, referring to the system 100, the evaluation determines whether images have been processed for each of the first light pair 108-1 and the second light pair 108-2. Where additional light pairs remain, the process 200 moves to the act of selecting another light source pair 236 and returning to the act of receiving a pair of images 230 for the selected light source pair. Alternatively, where at the act 250 no additional light pairs remain, the process moves to the act of providing a photometric stereo reconstruction result 234.

According to the illustrated embodiment, the act of providing a photometric stereo reconstruction result 234 includes multiple approaches to output a photometric stereo reconstruction result for the surface. Each approach is based on the pairs of images (received at the act of receiving a pair of images 230) and the sets of pixels (identified at the act of identifying a set of pixels for the pair of images 232). In general, a first of the two approaches includes the act of identifying a global set of pixels 240 followed by the act of correcting values of the global set of pixels 242 or the act of returning the global set of pixels 244. The second of the two approaches includes the act of using the sets of pixels identified for each image pair 246 including the act of disregarding or reducing the weight of image pairs 248.

According to the first approach illustrated in FIG. 2, for the full set of images including all of the pairs of images, a global set of pixels where a photometric stereo condition is not satisfied is identified based on the sets of pixels identified for each of the image pairs at act 232. Here, "global" refers to the fact that the set of pixels combines the sets of invalid pixels identified for each of the image pairs. For example, a first set of pixels may be identified as being invalid in a first pair of images that is different from a second set of pixels identified in a second pair of images. Where the preceding is true, the global set of pixels identified at the act 240 includes both sets of pixels, that is, pixels included in either the first set of pixels or the second set of pixels (or both).

Depending on the embodiment, different acts are performed following the act of identifying a global set of pixels 240. According to a first embodiment, at the act 242, the values of invalid pixels included in the global set of pixels in an original photometric stereo reconstruction are corrected to obtain a corrected photometric stereo reconstruction, which is output as the photometric stereo reconstruction result.

The second embodiment, at act 244, returns both the original photometric stereo reconstruction and the identification of the global set of pixels identified at the act 240 as the photometric stereo reconstruction result. Here, because the original photometric stereo reconstruction is provided without attenuation, the global set of pixels is returned at the act 244. The second embodiment is employed to output the original reconstruction and the identification of pixels to allow an application receiving the output to perform further processing as desired to eliminate or reduce artifacts that may appear at a location of the set of pixels identified as invalid.

The second of the two approaches includes the act of using the sets of pixels identified for each image pair in the calculation of the photometric stereo reconstruction result 246 and, more specifically, the act of disregarding or reducing the weight of image pairs 248 in the calculation for a pixel based on the sets of pixels. Here, the process 200 attenuates the identified sets of pixels to reduce or eliminate the effect of artifacts that may otherwise result in the photometric stereoscopic image. For example, at the act 248, image pairs where invalid pixels are identified can be disregarded in the process of generating the photometric stereoscopic image for the invalid pixels. In another approach, the weight given to image pairs where invalid pixels are identified can be reduced in the process of generating the photometric stereoscopic image for the invalid pixels.

Figure 3:
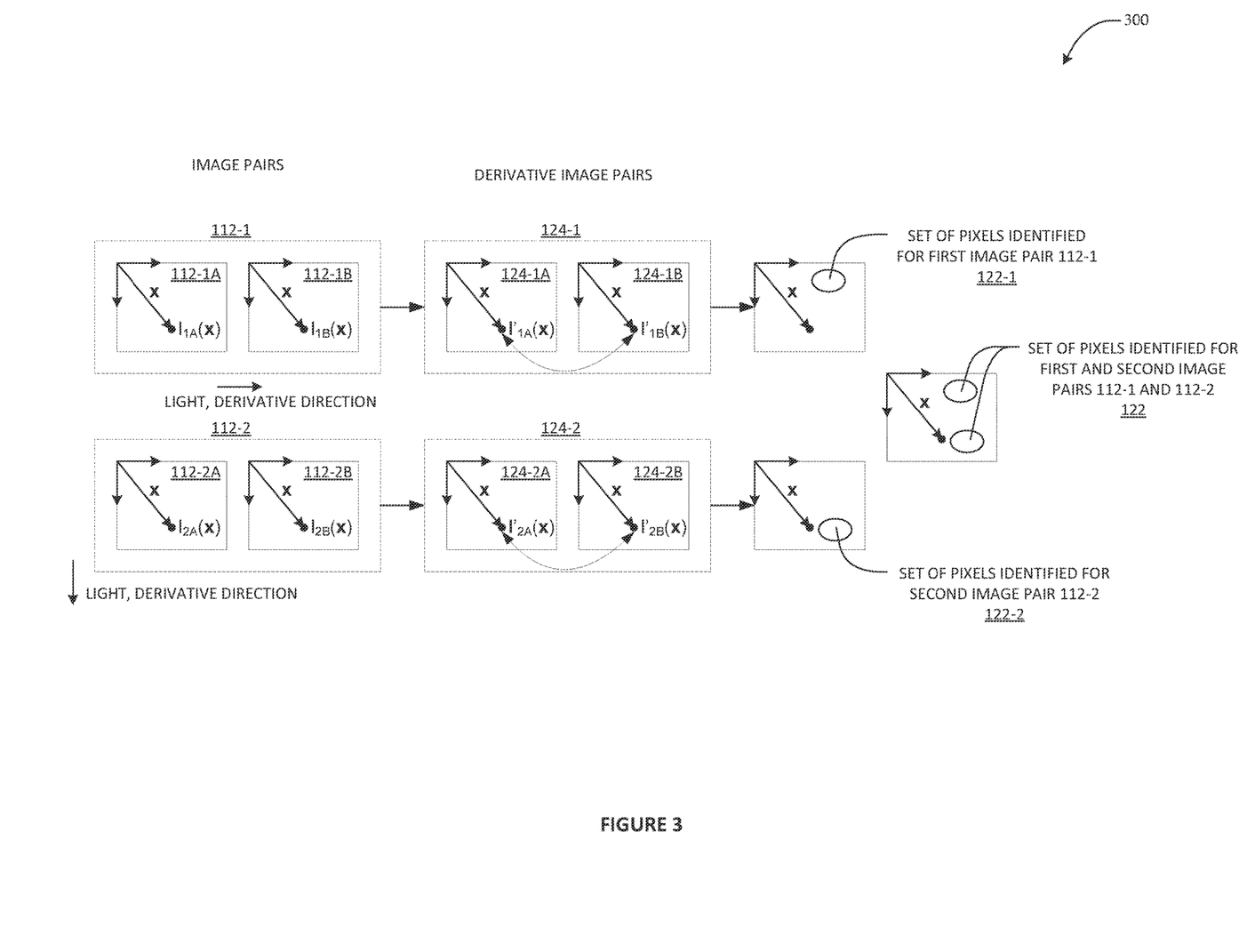
FIG. 3 illustrates an example of images processed to generate a photometric stereo reconstruction in accordance with one embodiment.

Referring to FIG. 3, a set of images 300 processed to generate a photometric stereo reconstruction are illustrated in accordance with one embodiment. The set of images 300 includes a first image pair 112-1, a second image pair 112-2, a first derivative image pair 124-1 and a second derivative image pair 124-2. The set of images 300 includes processed image data including a first set of identified pixels 122-1, a second set of identified pixels 122-2 and a combined set of identified pixels 122.

The first image pair 112-1 includes a first image 112-1A and a second image 112-1B. The set of images 300 represents images and associated processed image data captured by a photometric stereo system, for example, the system 100 illustrated in FIGS. 1A and 1B. That is, a first pair of light sources is operated by first illuminating a surface from a first direction with a first light along an axis from above at a first elevation angle while all the other light sources 108 remain off. Then the first light source is turned off and the surface is illuminated from a second direction with a second light facing along the axis at a direction opposite the direction the first light faces. The second light illuminates the surface from above at a second elevation angle. According to one embodiment, the second elevation angle substantially equals the first elevation angle.

The first pair of images 112-1 includes a first image 112-1A of the surface 104 as illuminated by the first light source 108-1A and a second image 112-1B of the surface 104 as illuminated by the second light source 108-1B. In the first pair of images 112-1, pixel locations are identified using a coordinate system such that at any pixel location x the reflected light intensity is represented as $I_{1A}(x)$ or $I_{1B}(x)$. The second pair of images 112-2 includes a third image 112-2A of the surface 104 as illuminated by the third light source 108-2A and a fourth image 112-2B of the surface 104 as illuminated by the fourth light source 108-2B. In the second pair of images 112-2, pixel locations are identified using a coordinate system such that at any pixel location x the reflected light intensity is represented as $I_{2A}(x)$ or $I_{2B}(x)$.

The overall process includes an act of processing the reflected light intensity by differentiating the values of the reflected light intensity. The first derivative image pair 124-1 illustrates a result of taking a derivative of the values of the first pair of images 112-1. The first derivative image pair 124-1 includes a first derivative image 124-1A and a second derivative image 124-1B where the derivative values are representative of the rate of change of the reflected light intensity in the direction of the axis of illumination when the first pair of images 112-1 is captured. In FIG. 3, the derivative direction is in an x-axis direction as illustrated beneath the first pair of images 112-1.

The second derivative image pair 124-2 illustrates a result of taking a derivative of the values of the second pair of images 112-2. The second derivative image pair 124-2 includes a third derivative image 124-2A and a fourth derivative image 124-2B where the derivative values are representative of the rate of change of the reflected light intensity in the direction of the axis of illumination when the second pair of images 112-2 is captured. In FIG. 3, the derivative direction is in a y-axis direction as illustrated beneath the second pair of images 112-2.

As described above concerning the process 200 and act 238, a known mathematical relationship exists between the derivative of the reflected light intensity at a given pixel when the surface is illuminated from a first direction and the derivative of the reflected light intensity at the pixel when the surface is illuminated from a second direction where the light sources are opposing one another and are oriented at the same elevation angle. This relationship provides that a proper photometric stereo condition exists where, if neither derivative has a null value, the derivatives do not have the same sign. The first set of pixels 122-1 represents the results of performing act 238 to identify invalid pixels by identifying pixels where the values included in the first derivative image 124-1A and the second derivative image 124-1B have the same sign (that is, both positive values or both negative values) where at least one of the derivatives is a non-null value. According to the illustrated embodiment, the first set of pixels 122-1 illustrates the invalid pixels identified from the first image pair 112-1. The second set of pixels 122-2 represents the results of performing the act 238 to identify invalid pixels by identifying pixels where the values included in the second derivative image 124-2A and the second derivative image 124-2B have the same sign (that is, both positive values or both negative values) where at least one of the derivatives is a non-null value. According to the illustrated embodiment, the second set of pixels 122-2 illustrates the invalid pixels identified from the second image pair 112-2.

FIG. 3 includes a combined set of identified pixels 122 obtained based on the first set of invalid pixels 122-1 identified via processing the first pair of images 112-1 and the second set of invalid pixels 122-2 identified via processing the second pair of images 112-2. These results can be employed as described with reference to FIG. 2 and the act of providing a photometric stereo reconstruction result 234.

For example, in some embodiments, the photometric stereo reconstruction result 114 is a "local shape" result that represents local 3-D shape variations of the surface. According to one embodiment, the local shape result is obtained by determining a first corrected local shape result for a first pair of images 112-1 captured using a first pair of light sources 108-1 that takes into account a corresponding first set of identified pixels 122-1; determining a second corrected local shape result for a second pair of images 112-2 captured using a second pair of light sources 108-2 that takes into account a corresponding second set of identified pixels 122-2; and combining the first and second corrected local shape results to obtain the overall corrected local shape result.

In the following description, the local shape result is obtained by processing information in the form of images. However, the local shape result can be obtained by processing information in other forms.

A local shape result takes the form of a local shape image (e.g., a grayscale image) LS where the intensity value LS(x) at a pixel location x in the local shape image provides the local shape result for that pixel location (which represents local shape information for a corresponding location of the surface).

A set of identified pixels is used to create a mask image M. In the mask image M, the pixel intensity value M(x) of pixels included in the set of identified pixels is determined differently from the pixel intensity value M(x) of the remaining pixels. In one example, the pixel intensity value M(x) has a value of zero (to mask out) or a relatively small value (to attenuate) for pixels included in the set of identified pixels. In one example of attenuation, the value M(x) is given by M(x)=a/(1+a) where a is an attenuation factor (e.g., selected by the user). The pixel intensity value M(x) has a value of 1 (no masking or attenuation) for the remaining pixels.

The first set of identified pixels 122-1 is used to create a first mask image M1 with a pixel intensity value M1(x). A first original local shape result (e.g., without masking or attenuation) is represented as a first original local shape image $LS1_{OR}$ with a pixel intensity value $LS1_{OR}(x)$. A first corrected local shape result (after masking or attenuation) is represented as a first corrected local shape image LS1 with a pixel intensity value LS1(x), which may be determined as a function of the first original local shape image LS OR and the first mask image M1, for example, as the product:

$$LS1 = M1 * LS1_{OR} \text{ where the pixel intensity value } LS1(x) = M1(x) * LS1_{OR}(x) \quad \text{Eq. (16)}$$

Similarly, a second corrected local shape result is represented as a second corrected local shape image LS2 determined as a function of a second original local shape image $LS2_{OR}$ and a second mask image M2 determined based on the second set of identified pixels 122-2:

$$LS2 = M2 * LS2_{OR} \text{ where the pixel intensity value } LS2(x) = M2(x) * LS2_{OR}(x) \quad \text{Eq. (17)}$$

A final corrected local shape result is represented as a final corrected local shape image LS with a pixel intensity value LS(x), which may be determined as a function of the first corrected local shape image LS1 and the second corrected local shape image LS2, for example, as the sum:

$$LS = LS1 + LS2 \text{ where the pixel intensity value } LS(x) = LS1(x) + LS2(x) \quad \text{Eq. (18)}$$

Referring again to FIG. 2 and the process 200, in some embodiments, the mathematical operations performed with Equations (16), (17) and (18) are performed at the act of providing a photometric reconstruction result 234, for example, at the act of using the sets of pixels identified for each image pair 246.

Figure 4:
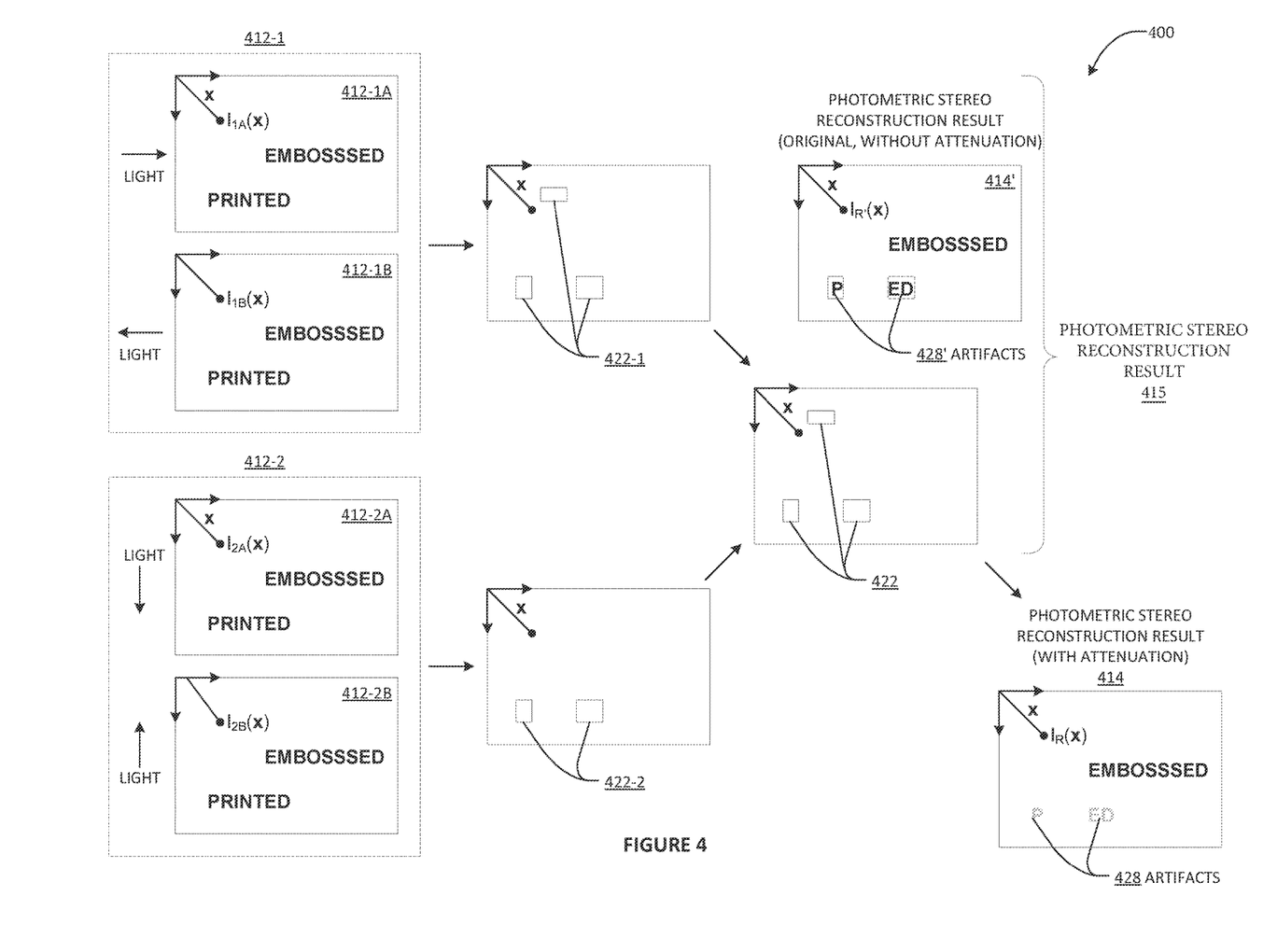
FIG. 4 illustrates an example of images processed to generate a photometric stereo reconstruction in accordance with one embodiment.

Referring now to FIG. 4, an example of images 400 processed to generate a photometric stereo reconstruction is illustrated in accordance with various embodiments. The example images 400 include images of the surface of an object that includes both indicia embossed on the surface and indicia printed on the surface. The indicia can include alpha characters, numerals, and/or graphics or other designs. FIG. 4 is representative of images and associated processed image data for a process that includes the act of identifying a set of pixels for a pair of images 232 and the act of providing a photometric stereo reconstruction result 234, the latter including, according to a first approach, the act of identifying a global set of pixels 240 followed by the act of correcting values of the global set of pixels 242 or the act of returning the global set of pixels 244, and according to a second approach, the act of using the sets of pixels identified for each image pair 246 and the act of disregarding or reducing the weight of image pairs 248 as illustrated and described with reference to FIG. 2 and the process 200.

In FIG. 4, the region of the surface that includes the embossing is illustrated with the word "EMBOSSED" and the region of the surface that includes the printing is illustrated with the word "PRINTED". The images 400 include a first image pair 412-1, a second image pair 412-2, a first set of pixels 422-1, a second set of pixels 422-2, a combined set of identified pixels 422, a first photometric stereo reconstruction result 414, a second photometric stereo reconstruction result 414 and a third photometric stereo reconstruction result 415.

The set of images 400 represents images and associated processed image data captured by a photometric stereo system, for example, the system 100 illustrated in FIGS. 1A and 1B. The first pair of images 412-1 includes a first image 412-1A of the surface 104 as illuminated by the first light source 108-1A and a second image 412-1B of the surface 104 as illuminated by the second light source 108-1B. In the first pair of images 412-1, pixel locations are identified using a coordinate system such that, at any pixel location x, the reflected light intensity is represented as $I_{1A}(x)$ or $I_{1B}(x)$. The second pair of images 412-2 includes a third image 412-2A of the surface 104 as illuminated by the third light source 108-2A and a fourth image 412-2B of the surface 104 as illuminated by the fourth light source 108-2B. In the second pair of images 412-2, pixel locations are identified using a coordinate system such that, at any pixel location x, the reflected light intensity is represented as $I_{2A}(x)$ or $I_{2B}(x)$.

While the overall process includes an act of processing the reflected light intensity by differentiating the values of the reflected light intensity provided by the first pair of images 412-1 and the second pair of images 412-2, for clarity the derivative images are not included in FIG. 4. The set of images 400 includes processed image data including a first set of identified pixels 422-1, a second set of identified pixels 422-2 and a combined set of identified pixels 422. For example, as previously described with reference to FIG. 3 and the first set of pixels 122-1 and the second set of pixels 122-2, the image-pairs 412-1 and 412-2 are processed to identify sets of invalid pixels 422-1 and 422-2. According to one embodiment, the set of images 400 is processed using the process 200 illustrated and described with reference to FIG. 2. The first set of identified pixels 422-1 includes an identification of invalid pixels determined by processing the derivative image pair corresponding to the first pair of images 412-1. Three regions are identified in the first set of identified pixels 422-1. The second set of identified pixels 422-2 includes an identification of invalid pixels determined by processing the derivative image pair corresponding to the second pair of images 412-2. Two regions are identified in the second set of identified pixels 422-2. The two regions identified in the second set of identified pixels 422-2 match two of the three regions identified in the first set of identified pixels 422-1.

According to the illustrated embodiment, the combined set of identified pixels 422 combines the first set of identified pixels 422-1 and the second set of identified pixels 422-2. As a result, all three regions identified in the first set of identified pixels 422-1 are included in the combined set of identified pixels 422.

Referring again to the process 200 and the act of providing a photometric stereo reconstruction result 234, different photometric stereo reconstruction results can be provided depending on the embodiment. In a first embodiment, a first photometric stereo reconstruction result 414 includes a result with attenuation. That is, the first photometric stereo reconstruction result 414 includes limited artifacts 428 included in the two regions identified both in the first set of identified pixels 422-1 and in the second set of identified pixels 422-2. The embossed text EMBOSSED also clearly appears in the first photometric stereo reconstruction result 414.

In the second photometric stereo reconstruction result 414', the original photometric stereo reconstruction result is provided without attenuation. Here, the second photometric stereo reconstruction result 414' includes artifacts 428' included in the two regions identified both in the first set of identified pixels 422-1 and in the second set of identified pixels 422-2. These artifacts are unattenuated and therefore pronounced in the photometric stereo reconstruction result. For example, artifacts corresponding the "P" and the "ED" in PRINTED clearly appear in the image with the embossed text EMBOSSED. The second embodiment includes in the third photometric stereo reconstruction result 415 both the second photometric stereo reconstruction result 414' and the combined set of identified pixels 422. This output can be provided to an application receiving the output (such as an application for recognition of characters that are embossed or etched on a surface) to perform further processing as desired to eliminate or reduce artifacts that may appear at a location of the sets of pixels identified as invalid.

Figure 5:
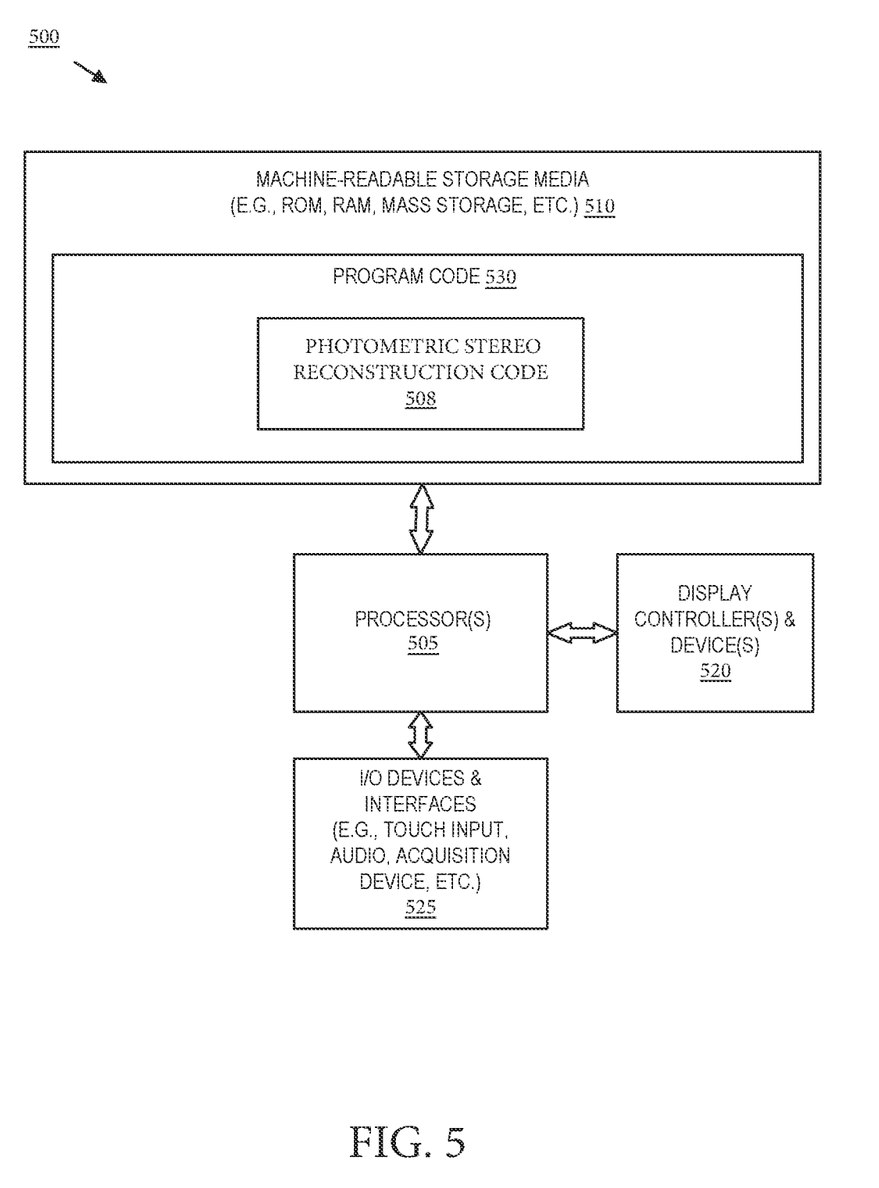
FIG. 5 illustrates a block diagram illustrating a data processing system that may be used in accordance with some embodiments.

Referring now to FIG. 5, a block diagram for a data processing system 500 that may be used is illustrated in accordance with some embodiments. The data processing system 500 includes one or more processors 505 and connected system components (e.g., multiple connected chips). Alternatively, the data processing system 500 is a system on a chip or Field-Programmable gate array. One or more such data processing systems 500 may be utilized to implement the functionality of the photometric stereo reconstruction engine and related processes as illustrated and described with reference to FIGS. 1-4.

The data processing system 500 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 510 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 505. For example, the depicted machine readable storage media 510 may store program code 530 that, when executed by the processor(s) 505, causes the data processing system 500 to perform efficient and accurate image processing and photometric stereo reconstruction. For example, the program code 530 may include program code 508, which when executed by the processor(s) 505, causes the data processing system 500 to perform the operations described with reference to FIGS. 1-4.

According to these embodiments, an electronic device (e.g., a computer or an FPGA) includes hardware and software, such as a set of one or more processors coupled to one or more machine-readable storage media to store code for execution on the set of processors and/or to store data. For example, an electronic device may include non-volatile memory containing the code since the non-volatile memory can persist the code even when the electronic device is turned off. While the electronic device is turned on the part of the code that is to be executed by the processor(s) of the electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The data processing system 500 may also include a display controller and display device 520 to provide a visual user interface for the user, e.g., GUI elements or windows. The visual user interface may be used to enable a user to input parameters to the system 100 for photometric stereo reconstruction, or any other task.

The data processing system 500 also includes one or more input or output ("I/O") devices and interfaces 525, which are provided to allow a user to provide input to, receive output from, and otherwise transfer data to and from the system. These I/O devices 525 may include a mouse, keypad, keyboard, a touch panel or a multi-touch input panel, camera, frame grabber, optical scanner, an audio input/output subsystem (which may include a microphone and/or a speaker for, for example, playing back music or other audio, receiving voice instructions to be executed by the processor(s) 505, playing audio notifications, etc.), other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 500.

The I/O devices and interfaces 525 may also include a connector for a dock or a connector for a USB interface, FireWire, Thunderbolt, Ethernet, etc., to connect the system 500 with another device, external component, or a network. Exemplary I/O devices and interfaces 525 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 500 with another device, external component, or a network and receive stored instructions, data, tokens, etc. It will be appreciated that one or more buses may be used to interconnect the various components shown in FIG. 5.

It will be appreciated that additional components, not shown, may also be part of the system 500, and, in certain embodiments, fewer components than that shown in FIG. 5 may also be used in a data processing system 500. For example, in some embodiments the data processing system 500 may include or be coupled with an image acquisition device for acquiring images.

Accordingly, the embodiments described above may be implemented in hardware, software, firmware, or any combination thereof. For example, they may be implemented in one or more computer programs executing on a programmable computer including a processor, a storage medium readable by the processor (including, for example, volatile and non-volatile memory and/or storage elements). According to some embodiments, the program code may be downloaded from a remote resource, for example, from a remote server accessed via the cloud over a wide area network such as the Internet.

Depending on the embodiment, the computer programs within the scope of the embodiments described herein may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Methods and associated acts in the various embodiments of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer, host systems or related accessories as well as other computers suitable for executing computer programs implementing the methods described herein.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of generating a photometric stereo reconstruction of a surface using an illumination system including a plurality of lights including a pair of lights, the pair of lights including a first light and a second light, the method comprising:
   capturing a first image of the surface with the surface illuminated from a first direction along an axis of the pair of lights by the first light with each other light of the plurality of lights off, the first light oriented at a first elevation angle;
   capturing a second image of the surface with the surface illuminated from a second direction along the axis of the pair of lights by the second light with each other light of the plurality of lights off, the second direction being opposite the first direction, the second light oriented at a second elevation angle, the second elevation angle being substantially identical to the first elevation angle;
   processing the first image by taking a derivative of a first reflected light intensity along the axis of the pair of lights at each of a first plurality of pixel locations in the first image, respectively;
   processing the second image by taking a derivative of a second reflected light intensity along the axis of the pair of lights at each of a second plurality of pixel locations in the second image, respectively, each one of the respective second plurality of pixel locations corresponding to a respective one of the first plurality of pixel locations;
   employing both the derivative of the first reflected light intensity taken at each of the first plurality of pixel locations in the first image and the derivative of the second reflected light intensity taken at each of the second plurality of pixel locations in the second image to identify a set of invalid pixels where a photometric stereo condition is not satisfied; and
   generating the photometric stereo reconstruction of the surface, the photometric stereo reconstruction based on a plurality of images including the first image and the second image and based on the identified set of invalid pixels.

2. The method of claim 1, further comprising identifying pixel locations among the first plurality of pixel locations for which a derivative of a first reflected light intensity has the same sign as a derivative of a second reflected light intensity taken at a corresponding pixel location among the second plurality of pixel locations, respectively,
   wherein, for each pair formed by a pixel location included in the identified pixel locations and the corresponding pixel location, at least one of the derivative of the first reflected light intensity at the pixel location identified among the first plurality of pixel locations and the derivative of the second reflected light intensity taken at the corresponding pixel location among the second plurality of pixel locations has a value that is non-null.

3. The method of claim 1, further comprising including in the photometric stereo reconstruction a corrected photometric stereo reconstruction of the surface generated by correcting a value of each pixel included in the set of invalid pixels, respectively, in a previously calculated photometric stereo reconstruction.

4. The method of claim 1, further comprising including in the photometric stereo reconstruction an identification of each pixel included in the set of invalid pixels, respectively.

5. The method of claim 1, further comprising, for each pixel included in the identified set of invalid pixels, disregarding or adjusting a weight of the first image and the second image in the generation of the photometric stereo reconstruction.

6. The method of claim 1,
   wherein the pair of lights is a first pair of lights,
   wherein the plurality of lights includes a plurality of pairs of lights that includes the first pair of lights, each unique pair of lights included in the plurality of pairs of lights including two lights positioned to illuminate the surface from opposite directions relative to one another along a common axis of the respective pair of lights, the two lights included in each unique pair of lights having substantially the same elevation angle as one another, respectively, wherein the first image and the second image provide a first image pair, and wherein the method further includes capturing a selected pair of images with the surface illuminated by each unique pair of lights, respectively, by:

a) capturing an image with the surface illuminated by a first selected light included in a selected pair of lights with each other light of the plurality of lights off;

b) capturing an image with the surface illuminated by the second selected light included in the selected pair of lights with each other light of the plurality of lights off; and c) until the selected pair of images is captured for each unique pair of lights, repeating acts a) and b) for each unique pair of lights, forming an image pair, for each unique pair of lights, with a combination of the image captured with the surface illuminated with the first selected light and the image captured with the surface illuminated with the second selected light, respectively;

for each image pair, processing the selected pair of images to identify the set of invalid pixels where the photometric stereo condition is not satisfied for the selected pair of images, respectively; and generating the photometric stereo reconstruction of the surface based on both the plurality of images including each of the selected pair of images and the identified set of invalid pixels for each of the selected pair of images.

7. The method of claim 6, further comprising providing a global set of invalid pixels by including all pixels identified by the set of invalid pixels where the photometric stereo condition is not satisfied for each of the selected pair of images, respectively.

8. The method of claim 7, further comprising including in the photometric stereo reconstruction a corrected photometric stereo reconstruction of the surface generated by correcting a value of each pixel included in the global set of invalid pixels, respectively.

9. The method of claim 7, further comprising including in the photometric stereo reconstruction an identification of each pixel included in the global set of invalid pixels, respectively.

10. The method of claim 6, further comprising:

including at least N pairs of lights in the plurality of pairs where N is an integer greater than one; and equally spacing the N pairs of lights for 360 degrees around an axis normal to a plane in which the surface is located.

11. A non-transitory computer-readable medium comprising computer program instructions executable by at least one computer processor that when executed by the at least one computer processor perform a method of generating a photometric stereo reconstruction of a surface using an illumination system including a plurality of lights including a pair of lights, the pair of lights including a first light and a second light, the method comprising:

capturing a first image of the surface with the surface illuminated from a first direction along an axis of the pair of lights by the first light with other light of the plurality of lights off, the first light oriented at a first elevation angle;

capturing a second image of the surface with the surface illuminated from a second direction along the axis of the pair of lights by the second light with each other light of the plurality of lights off, the second direction being opposite the first direction, the second light oriented at a second elevation angle, the second elevation angle being substantially identical to the first elevation angle;

processing the first image by taking a derivative of a first reflected light intensity along the axis of the pair of lights at each of a first plurality of pixel locations in the first image, respectively;

processing the second image by taking a derivative of a second reflected light intensity along the axis of the pair of lights at each of a second plurality of pixel locations in the second image, respectively, each one of the respective second plurality of pixel locations corresponding to a respective one of the first plurality of pixel locations;

employing both the derivative of the first reflected light intensity taken at each of the first plurality of pixel locations in the first image and the derivative of the second reflected light intensity taken at each of the second plurality of pixel locations in the second image to identify a set of invalid pixels where a photometric stereo condition is not satisfied; and generating the photometric stereo reconstruction of the surface, the photometric stereo reconstruction based on a plurality of images including the first image and the second image and based on the identified set of invalid pixels.

12. The non-transitory computer-readable medium of claim 11, the method further comprising identifying pixel locations among the first plurality of pixel locations for which a derivative of a first reflected light intensity has the same sign as a derivative of a second reflected light intensity taken at a corresponding pixel location among the second plurality of pixel locations, respectively, wherein, for each pair formed by a pixel location included in the identified pixel locations and the corresponding pixel location, at least one of the derivative of the first reflected light intensity at the pixel location identified among the first plurality of pixel locations and the derivative of the second reflected light intensity taken at the corresponding pixel location among the second plurality of pixel locations has a value that is non-null.

13. The non-transitory computer-readable medium of claim 11, the method further comprising including in the photometric stereo reconstruction a corrected photometric stereo reconstruction of the surface generated by correcting a value of each pixel included in the set of invalid pixels, respectively, in a previously calculated photometric stereo reconstruction.

14. The non-transitory computer-readable medium of claim 11, the method further comprising including in the photometric stereo reconstruction an identification of each pixel included in the set of invalid pixels, respectively.

15. The non-transitory computer-readable medium of claim 11, the method further comprising, for each pixel included in the identified set of invalid pixels, disregarding or adjusting a weight of the first image and the second image in the generation of the photometric stereo reconstruction.

16. The non-transitory computer-readable medium of claim 11, wherein the pair of lights is a first pair of lights, wherein the plurality of lights includes a plurality of pairs of lights that includes the first pair of lights, each unique pair of lights included in the plurality of pairs of lights including two lights positioned to illuminate the surface from opposite directions relative to one another along a common axis of the respective pair of lights, the two lights included in each unique pair of lights having substantially the same elevation angle as one another, respectively, wherein the first image and the second image provide a first image pair, and wherein the method further includes capturing a selected pair of images with the surface illuminated by each unique pair of lights, respectively, by:

d) capturing an image with the surface illuminated by a first selected light included in a selected pair of lights with each other light of the plurality of lights off;

e) capturing an image with the surface illuminated by the second selected light included in the selected pair of lights with each other light of the plurality of lights off; and f) until the selected pair of images is captured for each unique pair of lights, repeating acts a) and b) for each unique pair of lights, forming an image pair, for each unique pair of lights, with a combination of the image captured with the surface illuminated with the first selected light and the image captured with the surface illuminated with the second selected light, respectively;

for each image pair, processing the selected pair of images to identify the set of invalid pixels where the photometric stereo condition is not satisfied for the selected pair of images, respectively; and generating the photometric stereo reconstruction of the surface based on both the plurality of images including each of the selected pair of images and the identified set of invalid pixels for each of the selected pair of images.

17. The non-transitory computer-readable medium of claim 16, the method further comprising providing a global set of invalid pixels by including all pixels identified by the set of invalid pixels where the photometric stereo condition is not satisfied for each of the selected pair of images, respectively.

18. The non-transitory computer-readable medium of claim 17, the method further comprising including in the photometric stereo reconstruction a corrected photometric stereo reconstruction of the surface generated by correcting a value of each pixel included in the global set of invalid pixels, respectively.

19. The non-transitory computer-readable medium of claim 17, the method further comprising including in the photometric stereo reconstruction an identification of each pixel included in the global set of invalid pixels, respectively.

20. The non-transitory computer-readable medium of claim 16, the method further comprising:
    including at least N pairs of lights in the plurality of pairs where N is an integer greater than one; and
    equally spacing the N pairs of lights for 360 degrees around an axis normal to a plane in which the surface is located.

21. The method of claim 6, further comprising, for each pixel included in the identified set of invalid pixels for a selected pair of images, disregarding or adjusting a weight of the selected pair of images in the generation of the photometric stereo reconstruction.

22. The non-transitory computer-readable medium of claim 16, the method further comprising, for each pixel included in the identified set of invalid pixels for a selected pair of images, disregarding or adjusting a weight of the selected pair of images in the generation of the photometric stereo reconstruction.

* * * * *